(12) United States Patent
Groendal et al.

(10) Patent No.: US 6,893,036 B2
(45) Date of Patent: May 17, 2005

(54) BICYCLE FRAME

(76) Inventors: Mark L. Groendal, 3988 Burlingame, Wyoming, MI (US) 49509; Robert E. Shook, Rte. 1 Box 2332 X, Lopez Island, WA (US) 98261

( * ) Notice: Subject to any disclaimer, the term of this patent is extended or adjusted under 35 U.S.C. 154(b) by 0 days.

(21) Appl. No.: 10/081,492

(22) Filed: Feb. 22, 2002

(65) Prior Publication Data

US 2003/0209875 A1 Nov. 13, 2003

Related U.S. Application Data

(60) Provisional application No. 60/270,699, filed on Feb. 22, 2001.

(51) Int. Cl.[7] ............................................. B62K 3/04
(52) U.S. Cl. ....................... 280/275; 280/278; 280/283
(58) Field of Search ............................. 280/274, 275, 280/281.1, 283, 278, 288.1–288

(56) References Cited

U.S. PATENT DOCUMENTS 4,669,747 A * 6/1987 Groendal .................... 280/283
4,792,150 A * 12/1988 Groendal et al. ........... 280/275
5,080,384 A * 1/1992 Groendal et al. ........... 280/275
5,330,219 A * 7/1994 Groendal et al. ........... 280/275
6,659,487 B1 * 12/2003 Raco .......................... 280/275

* cited by examiner

Primary Examiner—Lesley D. Morris
Assistant Examiner—Matt Luby
(74) Attorney, Agent, or Firm—Waters & Morse P.C.

(57) ABSTRACT

In a bicycle frame of the type wherein front and rear portions of the frame are connected together by a flexible spring member, the spring includes at least two laterally spaced, elongated rods extending between opposed mounting blocks in the front and rear portions of the frame, with the ends of the rods being held in the mounting blocks by a clamping mechanism that can be released to permit removal and replacement of the spring members when desired. A replaceable wire management tube is attached to the side of the crossbar of the bike by adhesive tape and extends at least a portion of the length of the crossbar. The bicycle frame can incorporate a folding mechanism that permits the front and rear portions of the bike to be folded together for easy portability of the bike.

3 Claims, 16 Drawing Sheets

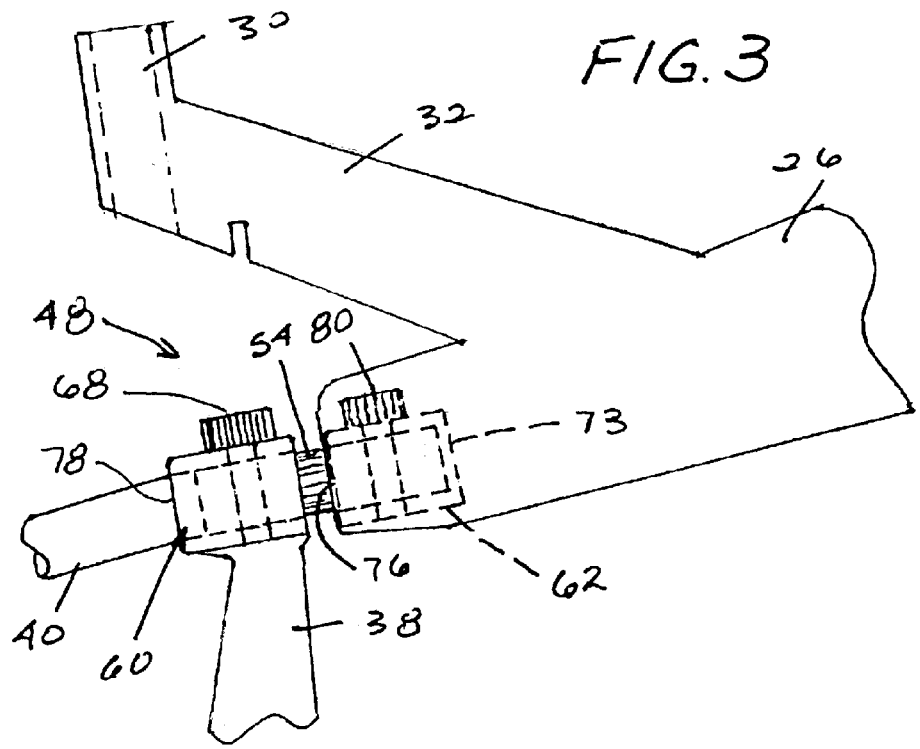
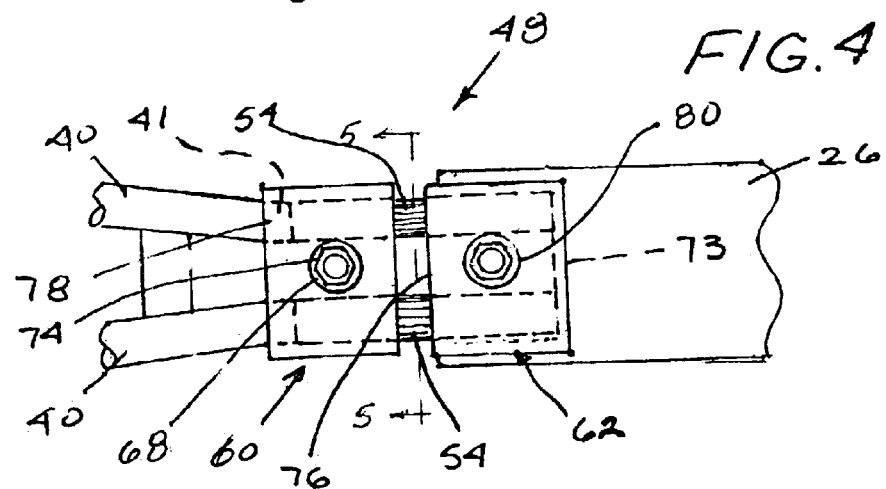
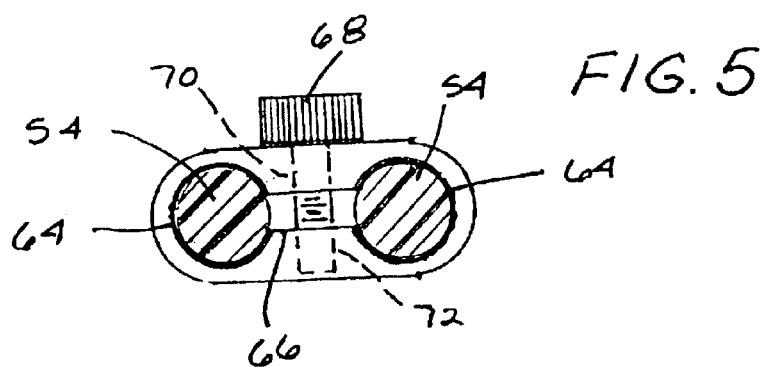

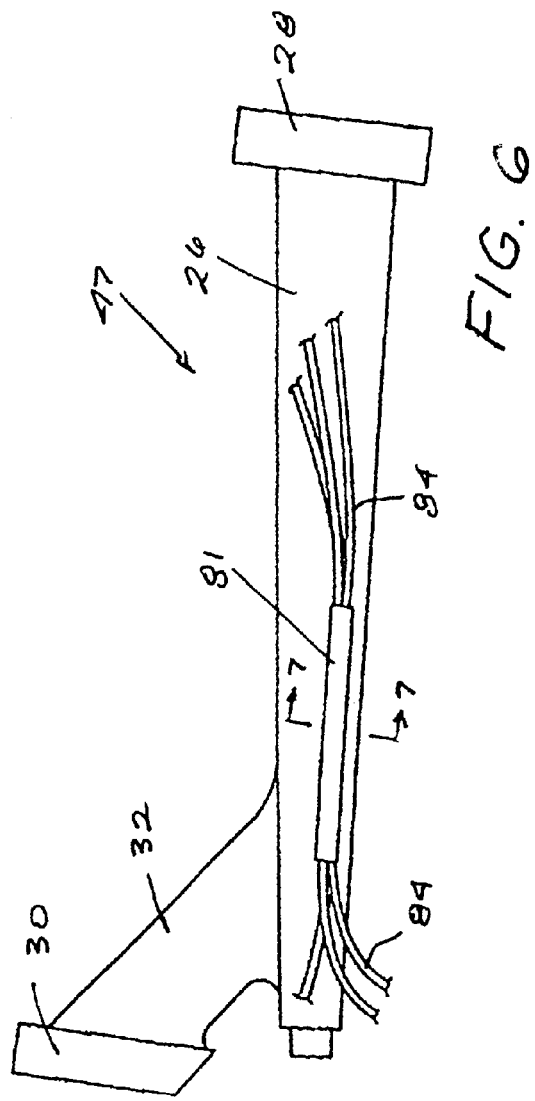
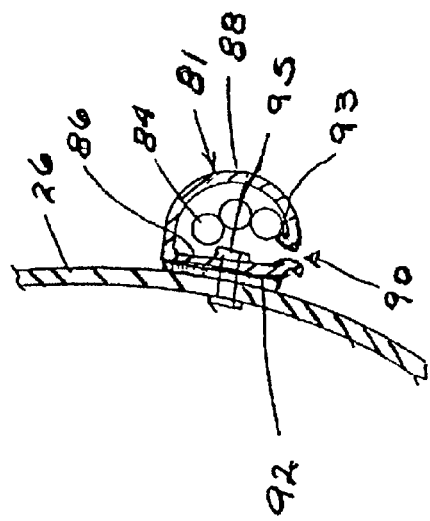

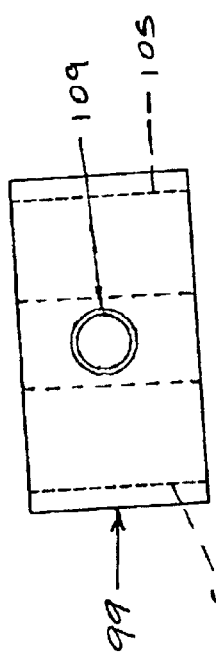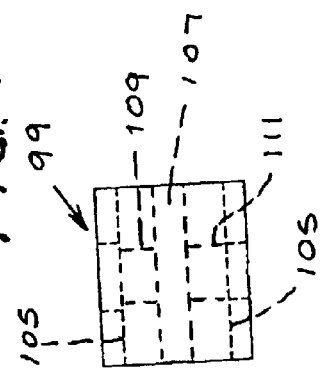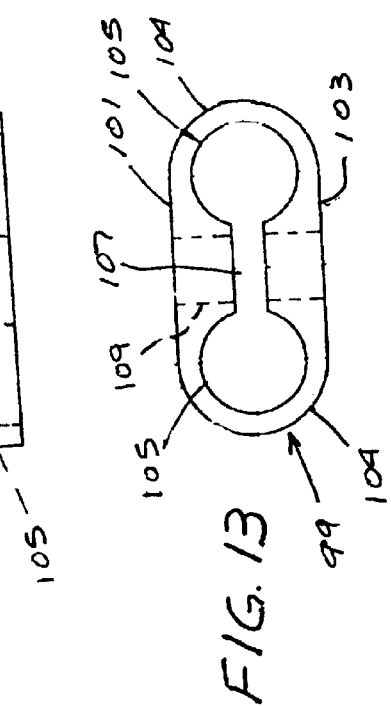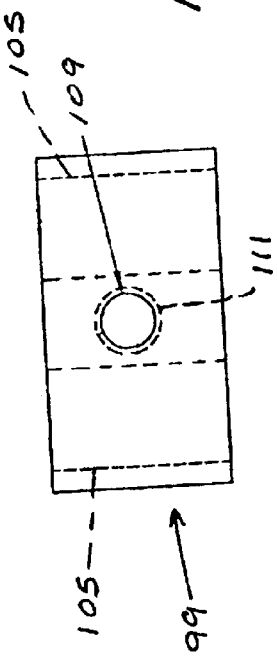

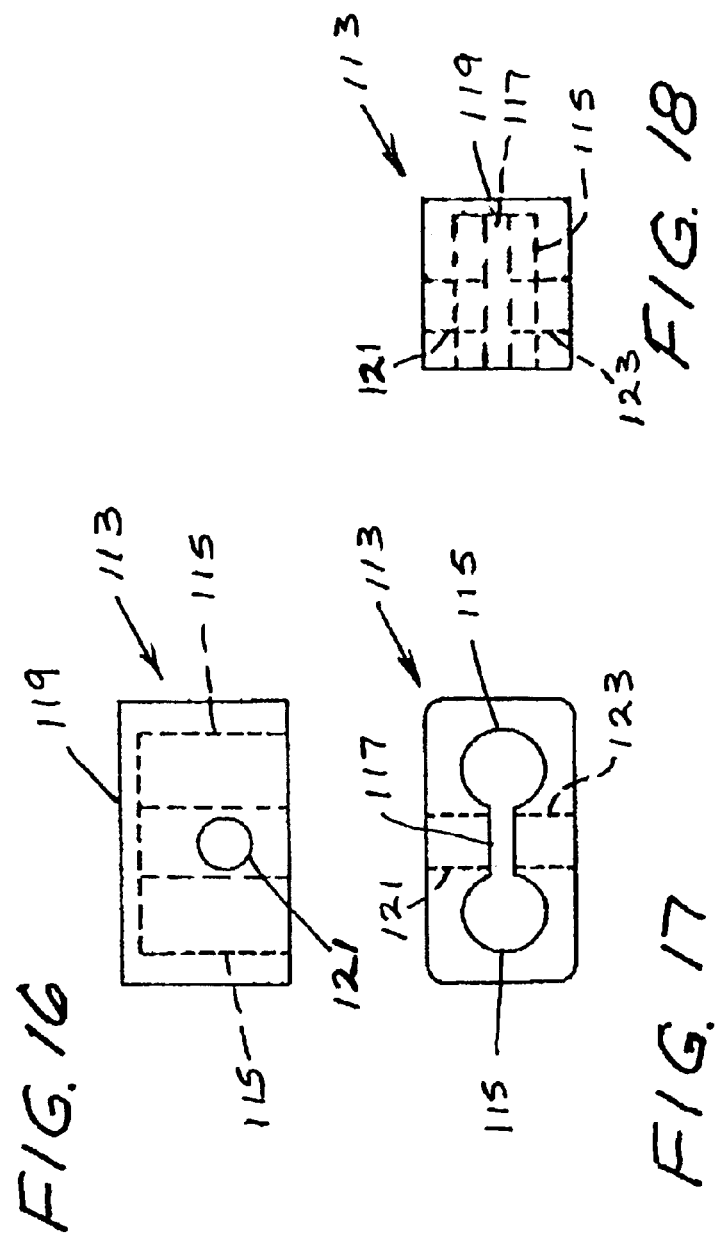

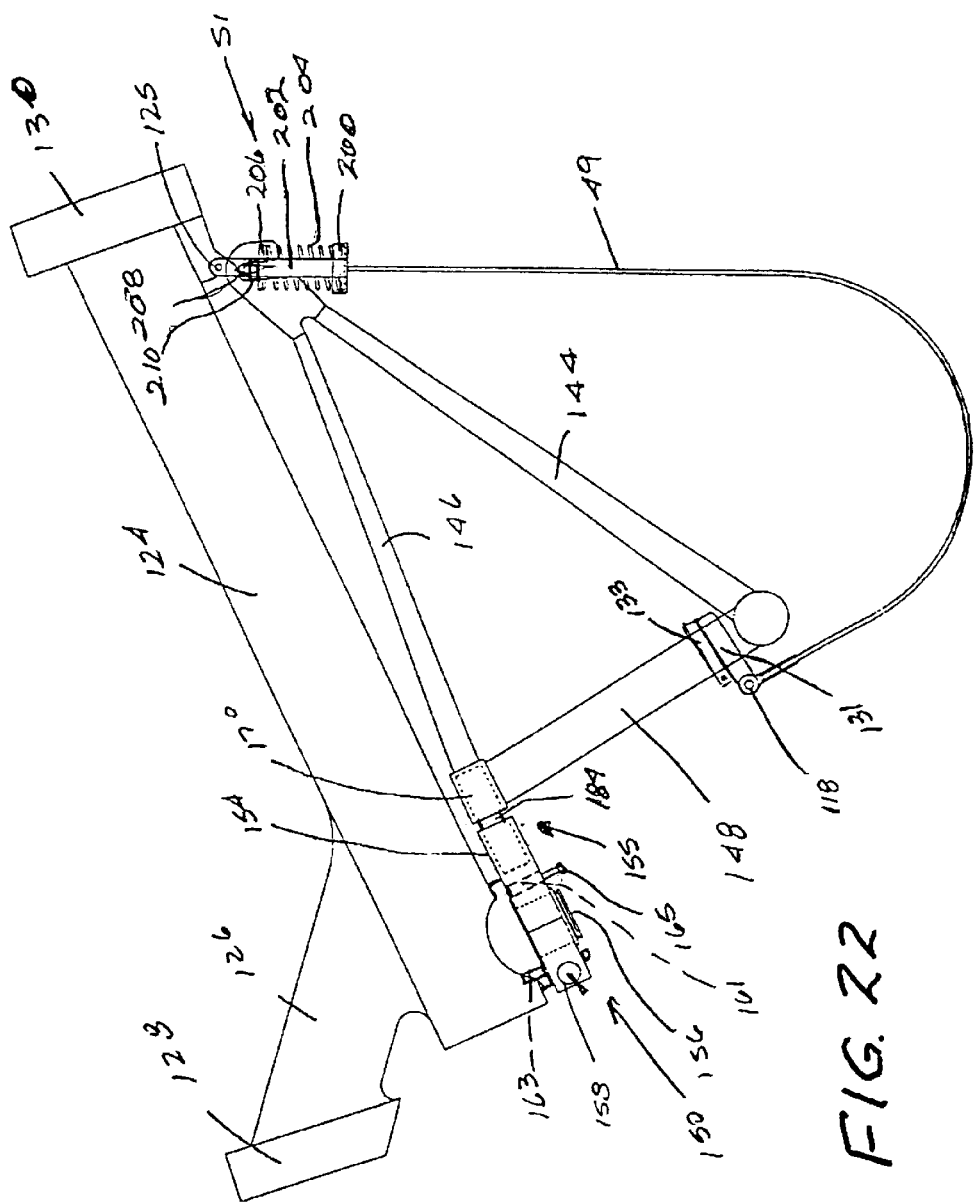

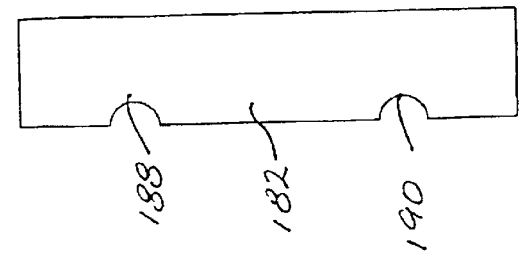
FIG. 25
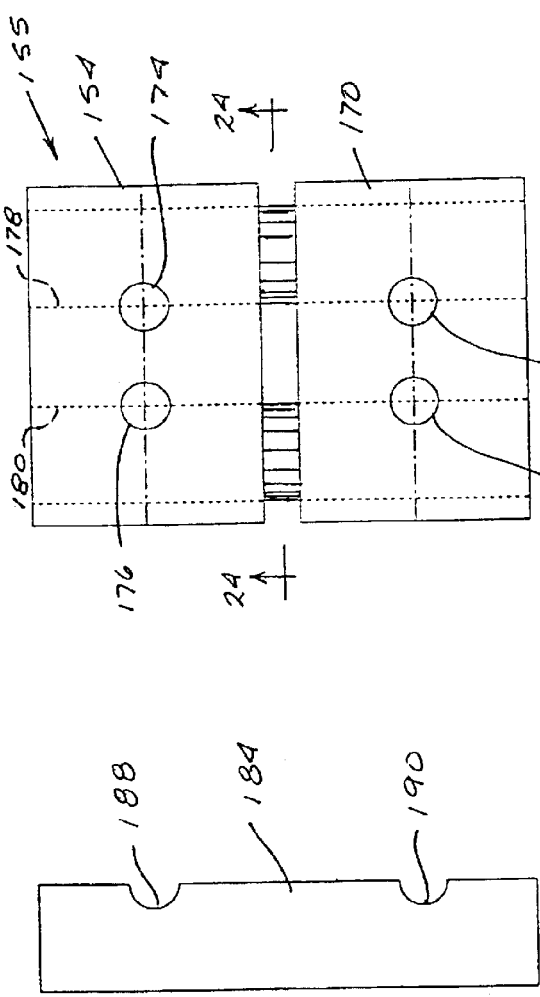
FIG. 23
FIG. 26
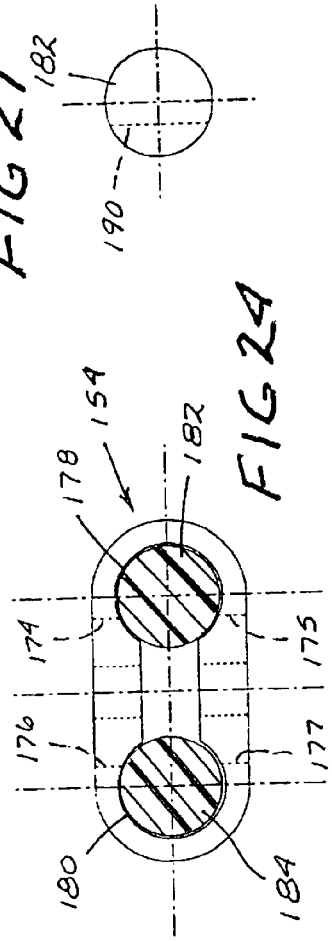
FIG. 27
FIG. 24
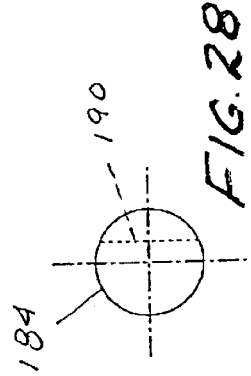
FIG. 28

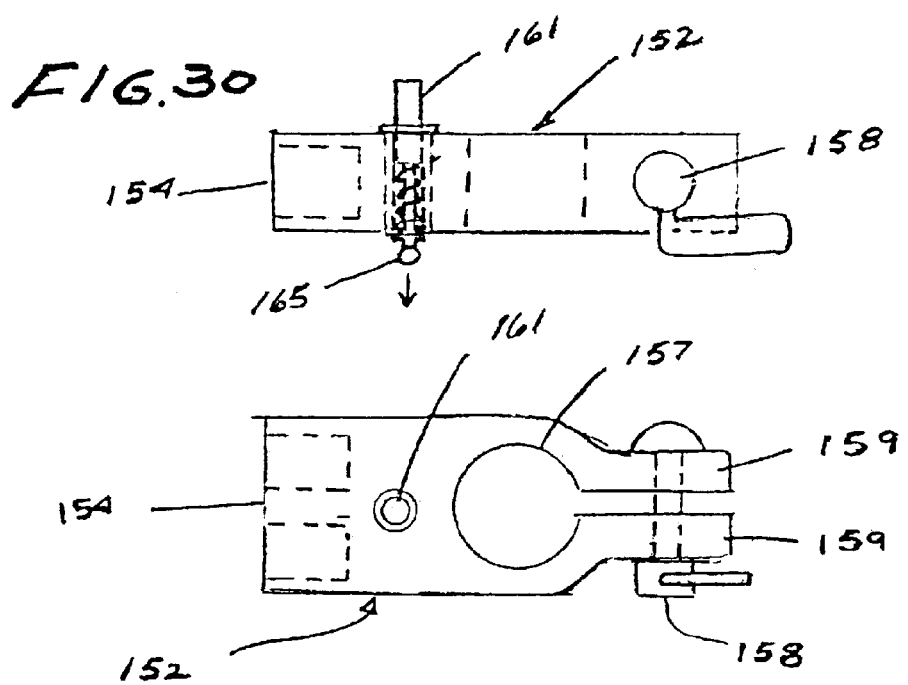

BICYCLE FRAME

CROSS-REFERENCES TO RELATED APPLICATIONS

This application is based on and claims the benefit of the filing date of Applicant's co-pending provisional application Serial No. 60/270,699, filed Feb. 22, 2001, which is incorporated herein by reference.

STATEMENT REGARDING FEDERALLY SPONSORED RESEARCH OR DEVELOPMENT

Not Applicable.

BACKGROUND OF THE INVENTION

The present invention relates to a bicycle frame incorporating an easily manufactured and easily replaceable shock absorber mechanism that provides increased torsional resistance.

Applicant's prior U.S. Pat. Nos. 4,792,150, 4,669,747, and 5,080,384, which are incorporated by reference, disclose a new type of bicycle frame incorporating a leaf spring connection between the top crossbar and seat tube (center post) of the frame, with a flexible cable connector extending between the head tube and lower end of the seat tube. The spring employed in U.S. Pat. Nos. 4,792,150 and 5,080,384 is a leaf spring comprising an elongated laminated fiberglass bar or plate having rounded edges that fit closely in oval openings in opposed fittings on the crossbar and seat tube. The springs are formed in multiple laminations of fiberglass reinforced resins. A substantial amount of work is required to shape the spring plates so that they fit closely in the fittings in the crossbar and seat tube. In addition, the spring plates have to be securely held in place by epoxy in order to maximize the rigidity of the frame. All of this requires a considerable amount of handwork and expense.

During operation over an extended period of time, all spring members eventually wear out. This is true of the fiberglass spring shown in the referenced patents. When this occurs, because of the complex construction of the springs and the extensive handwork required to remove and install new springs, springs generally are not replaced in the field. Instead, the frame must be returned to the factory for installation of new springs. This involves considerable expense to the bicycle owner and a considerable delay in the use of the bicycle.

An object of the present invention is to provide a suspension frame employing rod-shaped springs that provide increased torsional rigidity and yet are less expensive and are easily replaceable by the bicycle owner in the field. Other objectives of the present invention are to incorporate the new spring mechanism in a special collapsible or folding frame and to provide for wire management through a new wire management tube.

SUMMARY OF THE INVENTION

The present invention comprises an improvement in a bicycle frame of the type wherein front and rear portions of the frame are connected together by a flexible spring member that permits the front and rear portions of the frame to flex with respect to one another. In accordance with the present invention, the spring includes at least two laterally spaced, elongated rods extending between opposed mounting blocks in the front and rear portions of the frame, with the ends of the rods being held in the mounting blocks by a clamping means that can be released to permit removal and replacement of the spring members when desired.

Desirably, a pultruded cylindrical fiberglass rod spring ⅜–1 inch in diameter and preferably ⅝ inch in diameter is employed as the spring.

In another aspect of the present invention, a wire management tube is attached to the side of the crossbar of the bike and extends at least a portion of the length of the crossbar. Control wiring extends through the tube and is conveniently held in place by the tube. The tube is formed of an extruded plastic tubing having one generally flat side and an arcuate side, with a slot formed longitudinally in the tube. A strip of double-sided pressure sensitive adhesive tape is applied to the flat side of the tube. The wire management tube can thus be attached to the bicycle frame and removed and replaced when desired.

In another aspect of the present invention, a bicycle frame incorporates a folding mechanism that permits the front and rear portions of the bike to be folded together for easy portability of the bike. A spring released locking mechanism is employed to hold the frame in operating position until the frame is to be folded for transportation.

These and other features of the present invention are described in detail below and shown in the appended drawings.

BRIEF DESCRIPTION OF THE SEVERAL VIEWS OF THE DRAWING

FIG. 3 is an fragmentary side elevational view of the spring assembly of the present invention.

FIG. 4 is a plan view of the spring assembly of FIG. 3.

FIG. 5 is a cross sectional view taken along lines 5—5 of FIG. 4.

FIG. 6 is a fragmentary side elevational view of the crossbar of the present invention and the wire management tube attached to the crossbar.

FIG. 7 is a cross sectional view taken along lines 7—7 of FIG. 6.

FIG. 12 is a plan view of a steel mounting block for the spring elements shown in FIGS. 1–10.

FIG. 13 is an end elevational view of the spring mounting block of FIG. 12.

FIG. 14 is a side elevational view of the mounting block of FIG. 12.

FIG. 15 is a bottom plan view of the mounting block of FIG. 12.

FIG. 16 is a plan view of another embodiment of the spring mounting block of the present invention.

FIG. 17 is an end elevational view of the mounting block of FIG. 16.

FIG. 18 is a side elevational view of the mounting block of FIG. 16.

FIG. 22 is a side elevational view of the bicycle frame of FIG. 21, showing the frame folded into its folded position.

FIG. 23 is a plan view of a second embodiment of the spring assembly mechanism of the present invention.

FIG. 24 is a cross sectional view taken along lines 24—24 of FIG. 23.

FIG. 25 is plan view of the spring element of FIG. 23.

FIG. 26 is a plan view of a second spring element of FIG. 23.

FIG. 27 is an end view of the spring element of FIG. 25.

FIG. 28 is an end view of the spring element of FIG. 26.

FIG. 29 is a plan view of the pivot arm of the collapsible frame of FIGS. 19–22.

FIG. 30 is a side elevational view of the pivot arm of FIG. 29.

DETAILED DESCRIPTION OF THE INVENTION

Figure 1:
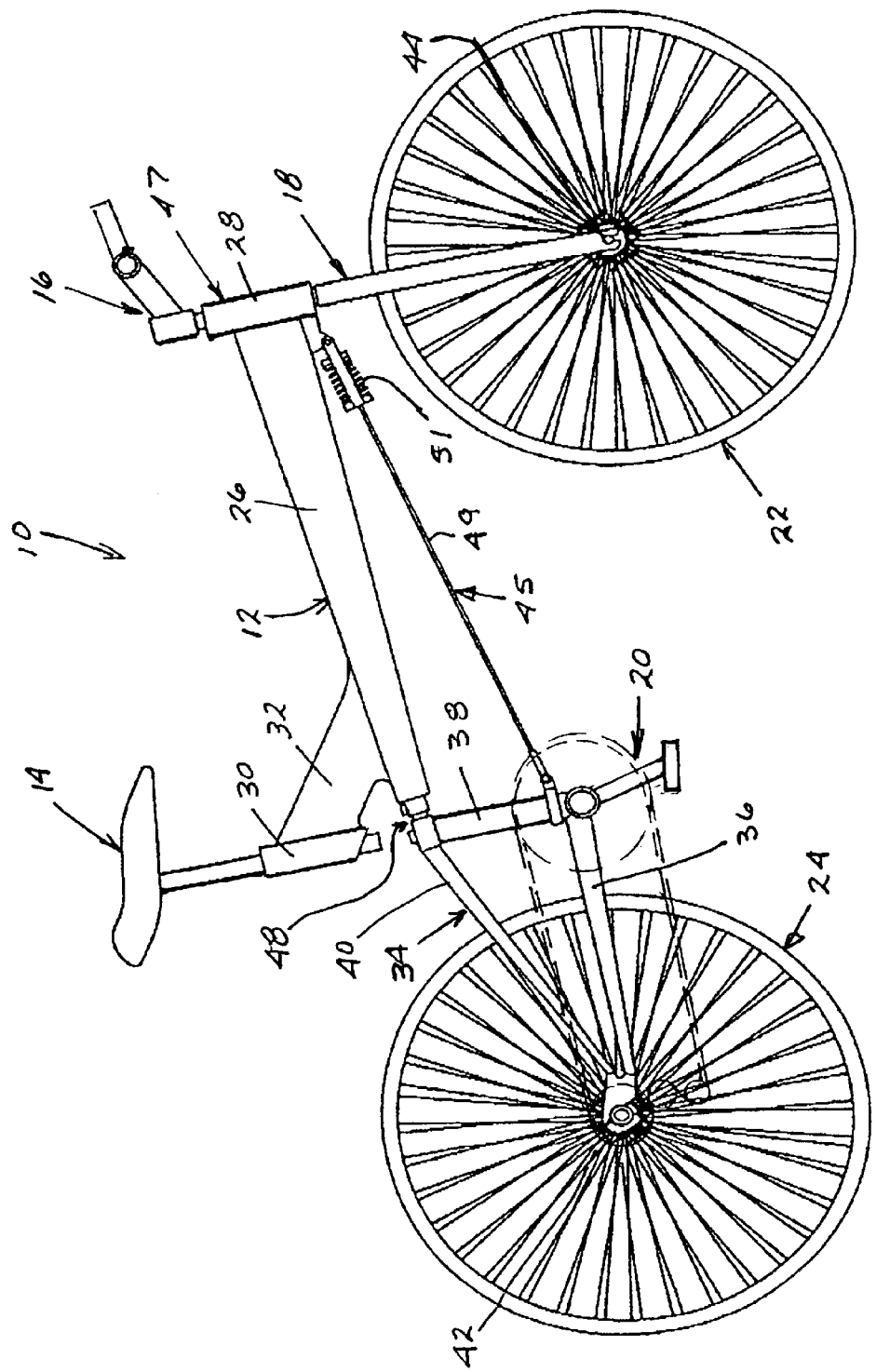
FIG. 1 is a side elevational view of a bicycle incorporating the bicycle frame of the present invention.
Figure 2:
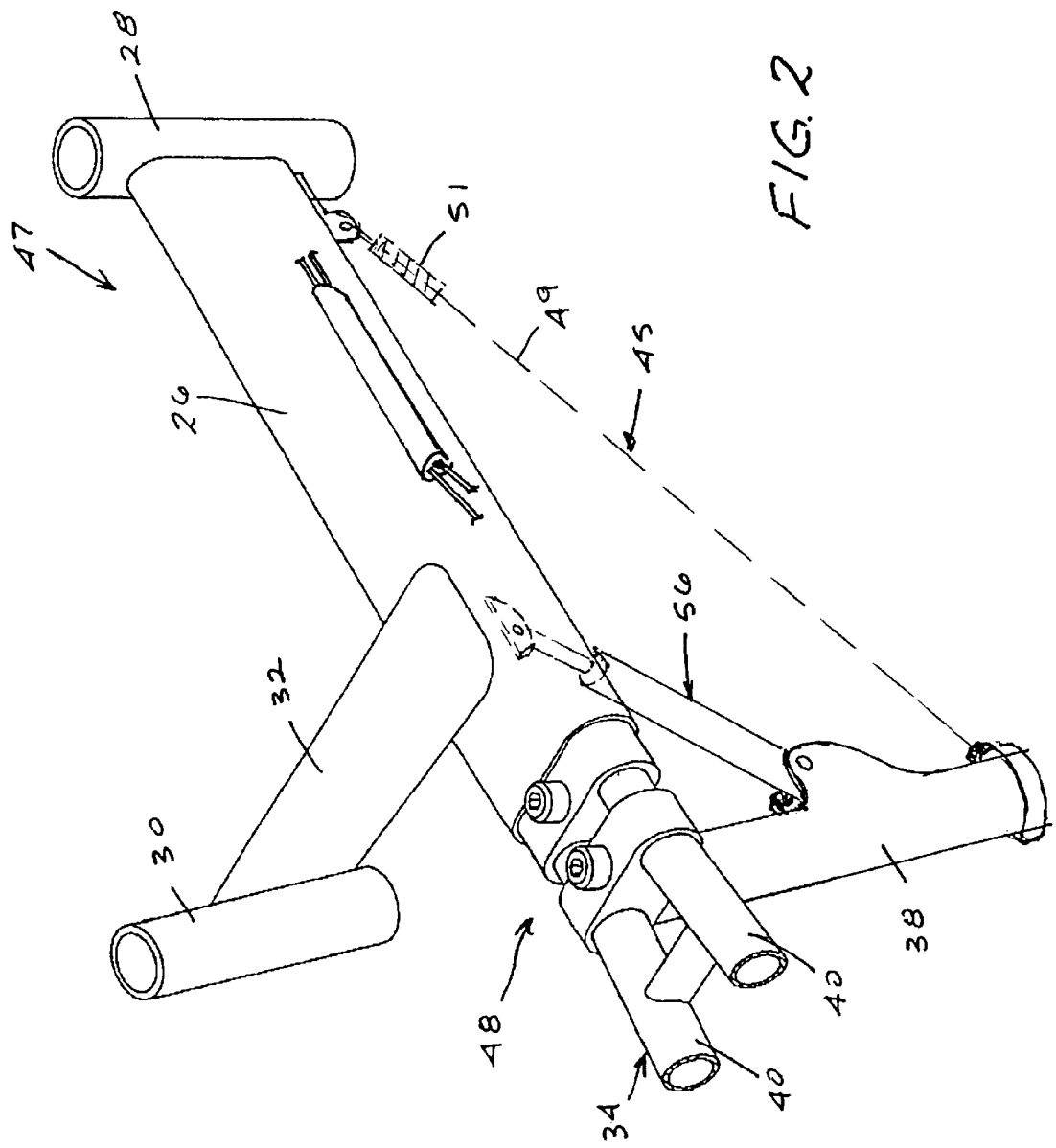
FIG. 2 is a fragmentary perspective view of the bicycle frame of FIG. 1, showing the spring assembly.

Referring to the drawings, a bicycle 10 incorporating the present invention is shown in FIGS. 1–7. Bicycle 10 includes frame 12 to which is mounted a seat assembly 14, handlebar assembly 16, front fork assembly 18, pedal and crank assembly 20, and front and rear wheels 22 and 24 respectively.

The frame includes a top tube or crossbar 26, which has a head tube 28 mounted at a front end thereof. A seat tube 30 is mounted on an upwardly and rearwardly extending bracket 32 that is mounted at a rear end of crossbar 26. A back or rear support triangle 34 comprises horizontal chain stay members 36, a downtube 38, and rearwardly extending seat stays 40. Rear wheel 24 is attached to dropout fittings 42 at the rear end of back triangle 34, while front wheel 22 is mounted on dropouts 44 at the lower ends of arms 46 of fork assembly 18.

The front portion 47 of the frame comprises crossbar 26, head tube 28 and seat tube 30, all of which are rigidly mounted together. The front portion 47 of the frame is attached to the back triangle of the frame by means of the spring assembly 48 of the present invention and a tension cable assembly 45, which includes a tension spring 51. The cable can be released from the frame by removable pins at opposite ends (see FIGS. 21 and 22 for details on the tension cable assembly).

Referring to FIG. 4, spring assembly 48 comprises a pair of opposed spring mounting blocks 60 and 62 attached to or formed in the rear end of the crossbar and an upper end of the down tube 38, with two or more spaced spring elements 54 being mounted in the blocks and extending between the blocks to form a resilient spring connection between the back triangle and front portion of the frame.

Springs 54 are formed of fiberglass reinforced resin in the shape of elongated rods. These rods, which are available commercially, may be formed by pultrusion in the form of long rods and then cut to their desired lengths. The rods are desirably round in cross section, but they could be other shapes. Also, while two rods are shown in the drawings, a greater number of rods could be employed. The rods are about five-eighths inches to three-quarters inches in diameter, with a tolerance of one to two thousandths inches being preferred. For extra strength, the rods can be covered with a carbon fiber or Kevlar wrap, with the wrap being epoxied in place.

The advantage of the rods of the present invention is that they can be fabricated easily and relatively inexpensively when compared with the multiple laminar construction of the spring plates of the prior frames. Moreover, by providing spaced parallel rods instead of a flat plate, they are easier to mount, and they provide improved torsional rigidity without increasing the overall spring stiffness of the bike. Torsional rigidity is accomplished by separating the rods by an increased distance. This increased separation does not increase the total mass of spring, so the spring flex characteristics in a vertical direction can remain the same. With a leaf spring, in order to increase the torsional rigidity, the spring must be made wider. This increases the mass of the spring and thus the stiffness of the spring unless the spring is made thinner. If the spring is made thinner, then the spring is more fragile. With the present invention, relatively thick rods can be spaced a substantial distance apart, leaving open space between the rods, and this provides maximum torsional rigidity at the edges of the spring while still maintaining a desired spring flex characteristic. Also, the stress on the rods is shear stress, not torsion.

The spring of the present invention is desirably formed of a pultruded fiberglass rod. A diameter of 5/8 inches is desirable, and a diameter range of 3/8–1 inch is satisfactory. If more springs than two is employed, the diameter of the springs is reduced as necessary in order to retain desired flex characteristics.

The fiberglass springs of the present invention act both as springs and a shock absorber. However, an additional shock absorber 56 (shown in FIG. 2) may be used in order to provide improved ride characteristics. Shock absorber 56 extends upwardly and forwardly from the down tube 38 to crossbar 26.

The manner in which the rod springs are mounted in the frame is shown in FIGS. 3–5. Rear ends of rods 54 are mounted in a rear mounting block 60, which is mounted at the top junction of seat stays 40 and down tube 38. A front mounting block 62 is mounted at the rear end of cross bar 26. Both mounting blocks include a pair of spaced openings 64 that are shaped to fit closely over rods 54. Thus, when rods 54 are in a desired round shape, openings 64 also are round. An open slot 66 extends between openings 64, thus leaving a compressible space between openings 64. A locking bolt 68 extends through an opening 70 in an upper surface of the mounting block and threads into a threaded opening 72 in a lower surface of the mounting block. Rotation of the bolt by means of a hex wrench that fits into a hex shaped opening 74 in the head of the bolt causes the upper and lower portions 70 and 72 to be compressed together. This in turn causes the openings 64 to contract and compress around the periphery of rods 54 and thus provides an even compression gripping force around the periphery of the rods. Because of the compressibility of the openings in the mounting blocks, it is not necessary to permanently affix the rods in the mounting blocks by the use of epoxy or the like. Accordingly, to remove the rods, bolt 68 can be released and the rods can be easily pulled out of the mounting blocks. Thus, replacement of the springs in the field is easy and can be handled by the bicycle owner with conventional tools.

While the mounting block shown in FIG. 5 is a one piece mounting block formed of steel or aluminum, the mounting block could be formed in two completely separate upper and lower sections with a space between the sections being provided so that the sections can clamp together on the mounting blocks. However, a one piece block with a compressible center section is desired because it provides a tighter and more uniform clamping force on the spring.

As shown in FIG. 4, front mounting block 62 is substantially the same in function as rear mounting block 60. Front mounting block 62 may have a closed end 73 at the end opposite open end 76 and this mounting block may be formed of aluminum in order to be compatible with an aluminum crossbar. A closed end facilitates attachment to the crossbar, but is not required. A closed end serves to limit the distance that the spring rods may be inserted into the mounting block. Rear mounting block 60 can be formed of steel and may have an open rear end 78. The ends 41 of seat stays 40 can be fitted and welded in the open end 78 of the mounting block. This provides a convenient and rigid mounting, while the ends of the seat stays limit the depth of insertion of the spring rods into the rear mounting block. A bolt 80 clamps the front ends of the rods in the front mounting block in the same manner as bolt 68 clamps the rear ends of the rods in mounting block 60. Desirably, the rods are mounted in the mounting blocks so that the rods extend about one to one and one-eighth inches into each block and there is about one-eighth to one-quarter inch of exposed rod between the mounting blocks.

Figure 9:
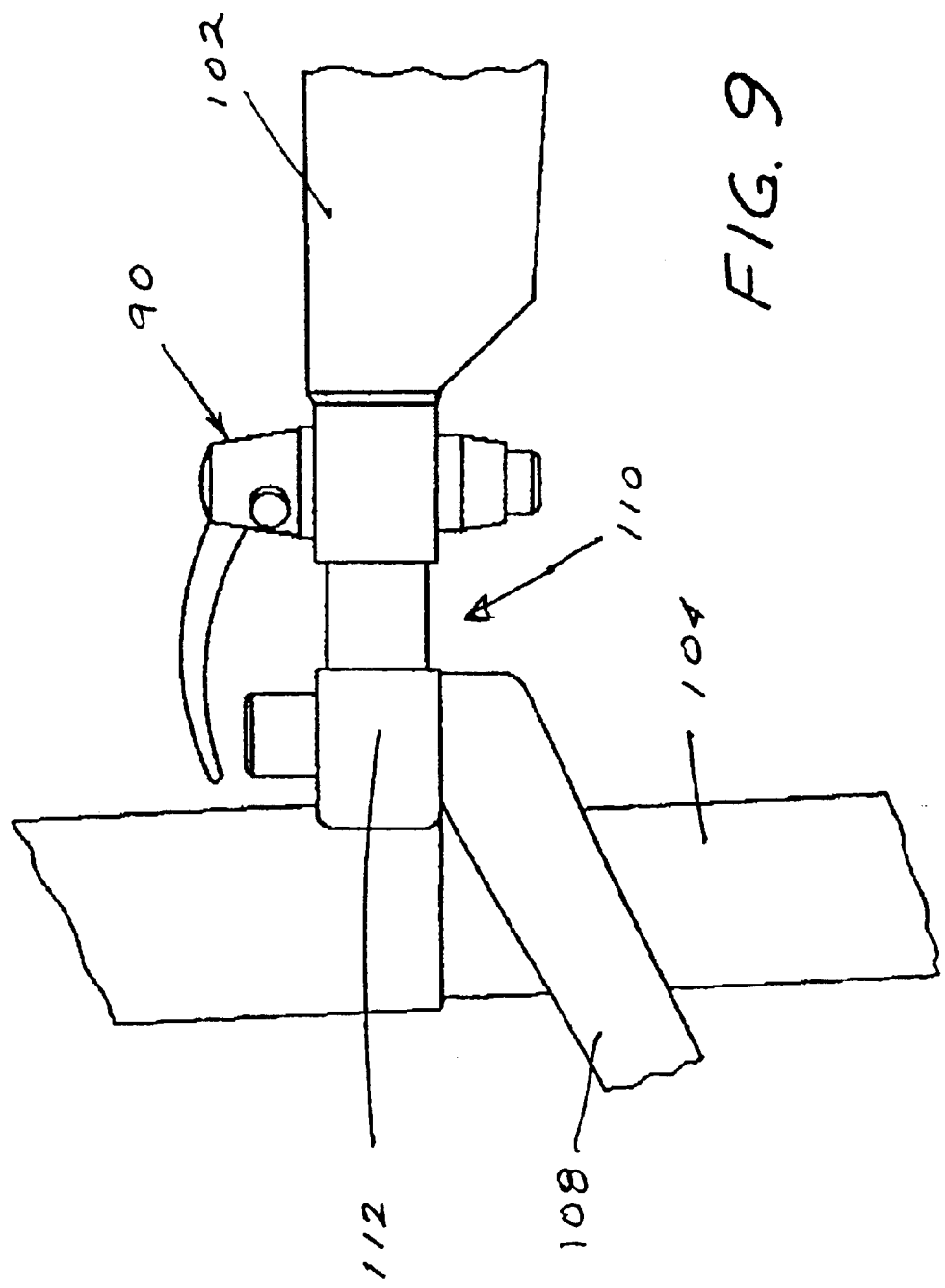
FIG. 9 is a fragmentary side elevational view of the frame of FIG. 8, showing of the spring assembly of the present invention.

The use of a spring assembly wherein spaced fiberglass rods are clamped into opposed mounting blocks and can easily be released from the mounting blocks also makes it more convenient to transport the bike. The entire rear triangle of the bicycle can be removed from the rest of the frame for compact packaging simply by releasing the springs from one of the mounting blocks and separating the back triangle from the frame. A quick release fastener 90, as shown in FIG. 9, can be used instead of one of the bolts 68 or 80 to facilitate disassembly of the frame.

Another feature of the invention is shown in FIGS. 6 and 7. A wire management tube 81 is attached to the side of crossbar 26 and extends at least a portion of the length of the crossbar. Wiring 84 extends through tube 81 and is conveniently held in a desired position by the tube. Tube 81 is formed of extruded plastic tubing having one generally flat side 86 and an arcuate side 88, forming a generally round tube having one flat side. A slot 90 is formed longitudinally along the tube. Wiring 84 can be inserted longitudinally through the slot in the tube and the natural resilience of the plastic tubing and rib 93 on the edge of the slot urge the wiring to stay inside the tubing. A strip of double-sided, pressure sensitive adhesive tape 92 is applied to the flat side 86 of the tube. Thus, the tube can be applied to the bicycle frame at any convenient location, simply by removing the release paper applied to the pressure sensitive adhesive and then pressing the flat side of the tubing to the desired location. The ends of the tube are also attached to the crossbar by pop rivets 95 to make the attachment more secure. Similarly, if the tubing breaks or is damaged for any reason, the broken tubing can be removed and new tubing can be applied to the frame easily. The tubing is shown in one convenient location in the present invention, but it should be understood that this tubing could be applied anywhere where it is desired. The slotted tubing assembly is commercially available and thus is relatively inexpensive.

The frame of FIG. 1 is different from the frames in applicant's above-cited prior patents in some important aspects. In the present invention, the seat tube and seat are mounted on the crossbar in front of spring assembly 48, with the spring being positioned between the rear wheel and the seat mechanism. In the prior patents, the seat was in effect rigidly connected with the support frame for the rear wheel, and the spring was positioned between the seat mechanism and the front portion of the frame. By having the seat connected to the front portion of the frame, an improved ride is provided.

Figure 8:
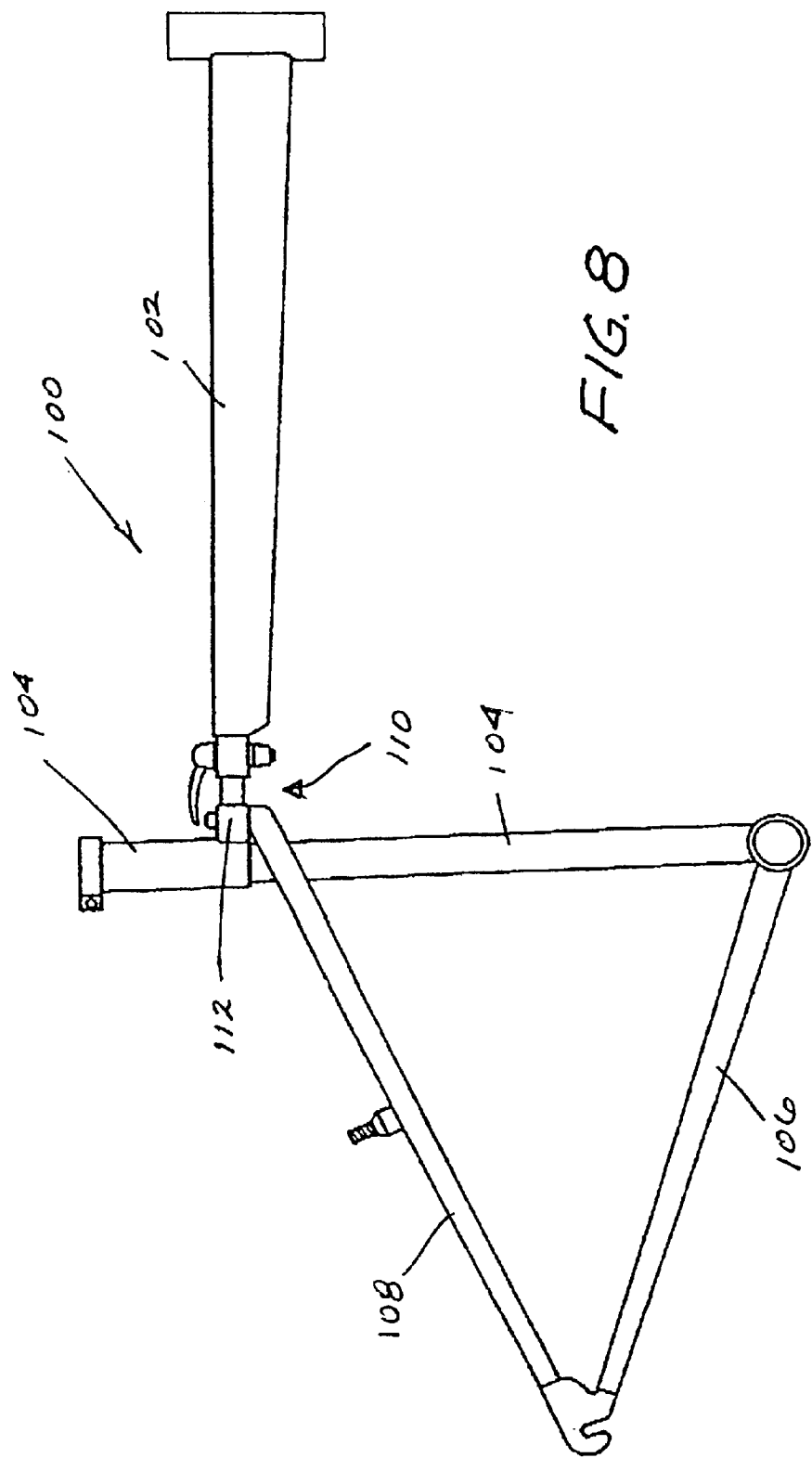
FIG. 8 is a side elevational view of a second embodiment of a frame of the present invention.
Figure 10:
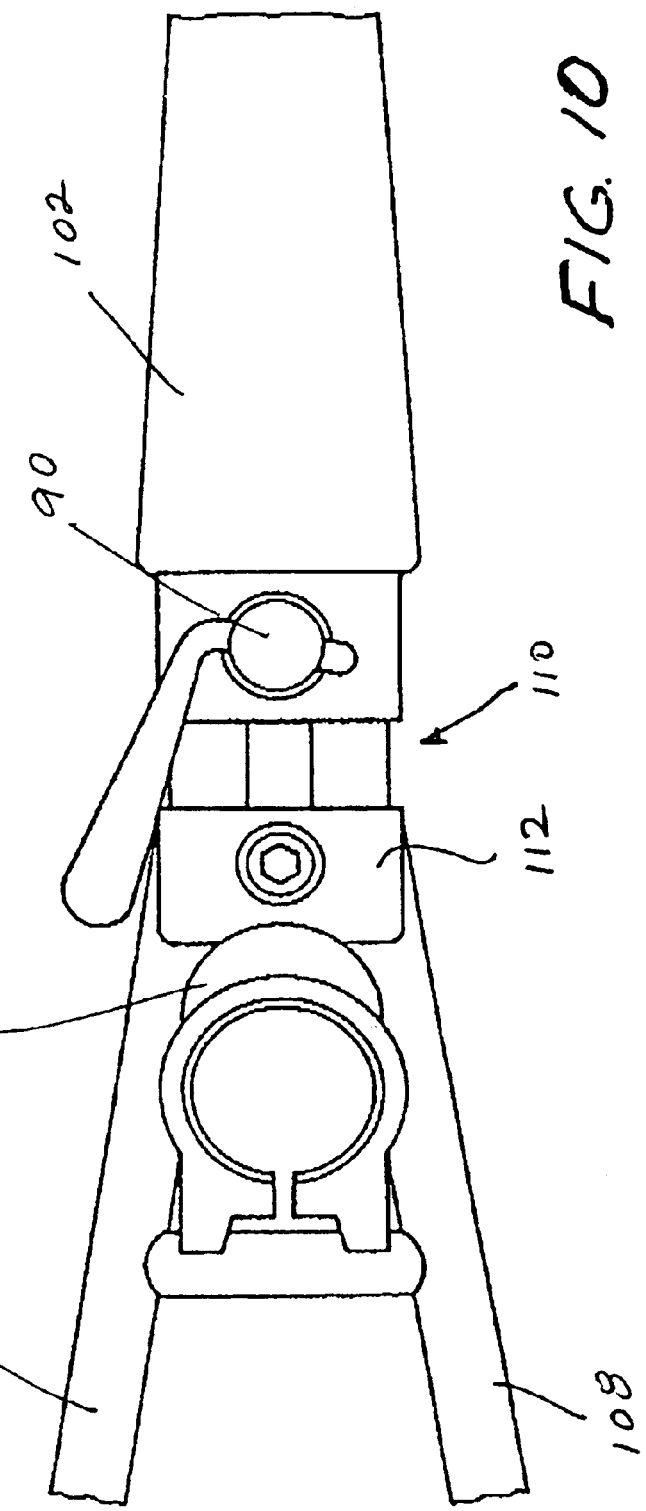
FIG. 10 is a plan view of the spring assembly of FIG. 9.
Figure 11:
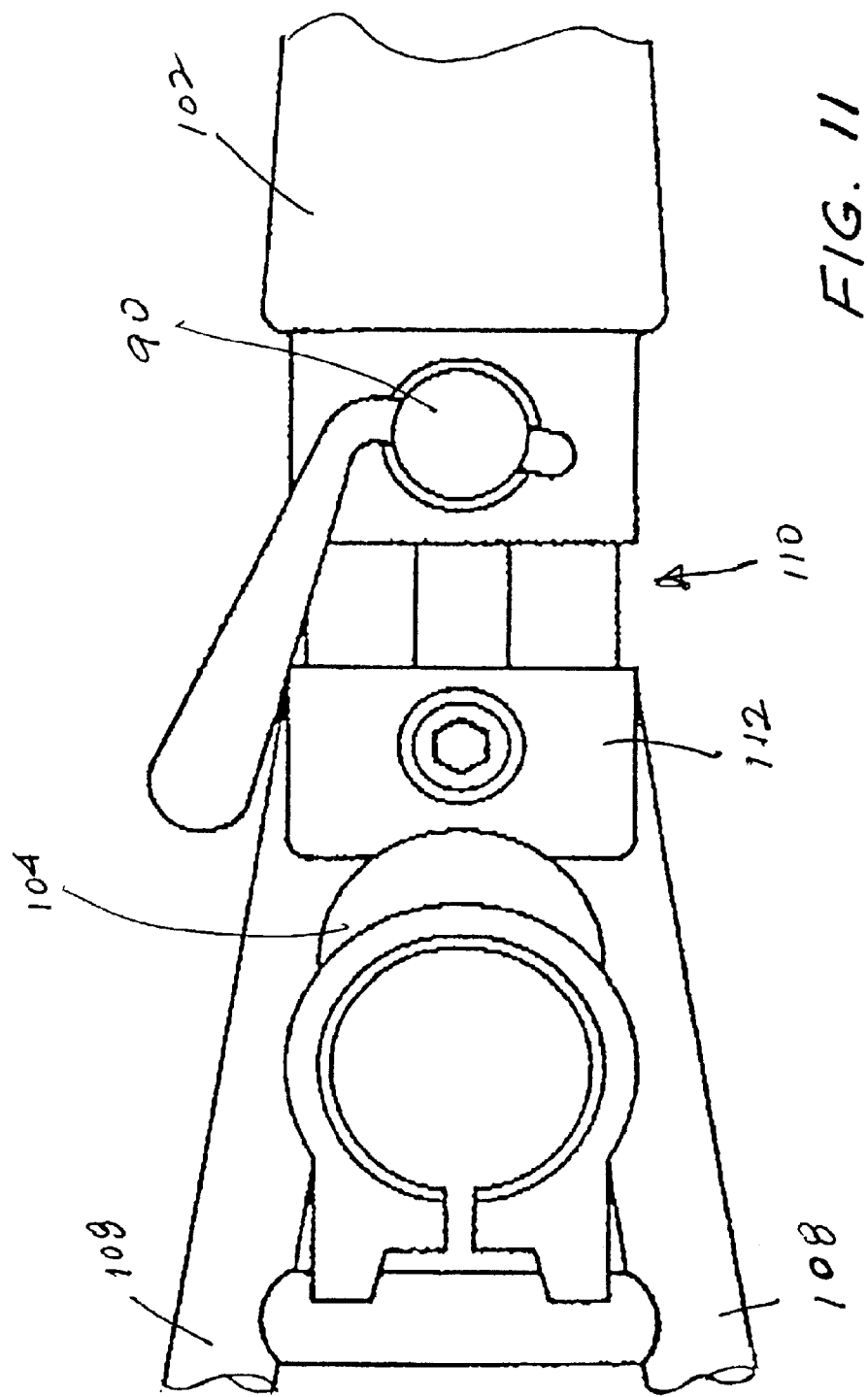
FIG. 11 is an enlarged plan view of the spring assembly of FIG. 10.

While the improved frame construction shown in FIG. 1 is desired, the spring mechanism of the present invention can also be employed in a more conventional frame 100, as shown in FIG. 8. Frame 100 comprises crossbar 102, seat tube 104, chainstays 106, and seatstays 108. Spring mechanism 110 interconnects the rear end of crossbar 102 with a fitting 112 at the junction of seatstays 108 and seat tube 104. As shown in FIGS. 9 and 10, the construction of the spring mechanism is substantially the same as in the prior embodiment, with a quick release fastener 90 being employed for easy disassembly of the bike for transportation or storage.

A more detailed illustration of the spring blocks employed in the present invention is shown in FIGS. 12–18. The spring block 99 of FIG. 12 can be a steel block that is typically attached to the rear triangle. Block 99 comprises parallel upper and lower surfaces 101 and 103, and rounded side edges 104. Openings 105 for the springs are spaced apart in the block and separated by an interconnecting slot 107. A vertical opening 109 through the block can be threaded at a lower portion 111. A locking bolt (which can include a quick release fitting) can be threaded into the block (or extended all the way through the opening in the block to a nut on the opposite side of the block) in order to compress the upper and lower surfaces together so as to grip tightly the fiberglass rod springs in their openings. The rounded sidewalls of the mounting block cause the mounting block to deflect or bend uniformly around the springs so as to grip the springs evenly when the center portion of the mounting block is compressed with the bolt.

An aluminum mounting block 113 formed of 6061 aluminum (preferably annealed T-0) is shown in FIGS. 16–18. This block is substantially rectangular with rounded corners and includes a pair of spaced openings 115 interconnected by a slot 117. A closed back 119 closes the rear end of the block. An opening 121, which can have a threaded lower end 123, extends vertically through the block. The remaining features of this block are substantially the same as the other block. The rounded block configuration of FIG. 13 is preferred to the more rectangular configuration of FIG. 17 because the rounded sidewalls adjacent the rod spring openings facilitate a better gripping force on the rod springs when the locking bolt is tightened.

Figure 19:
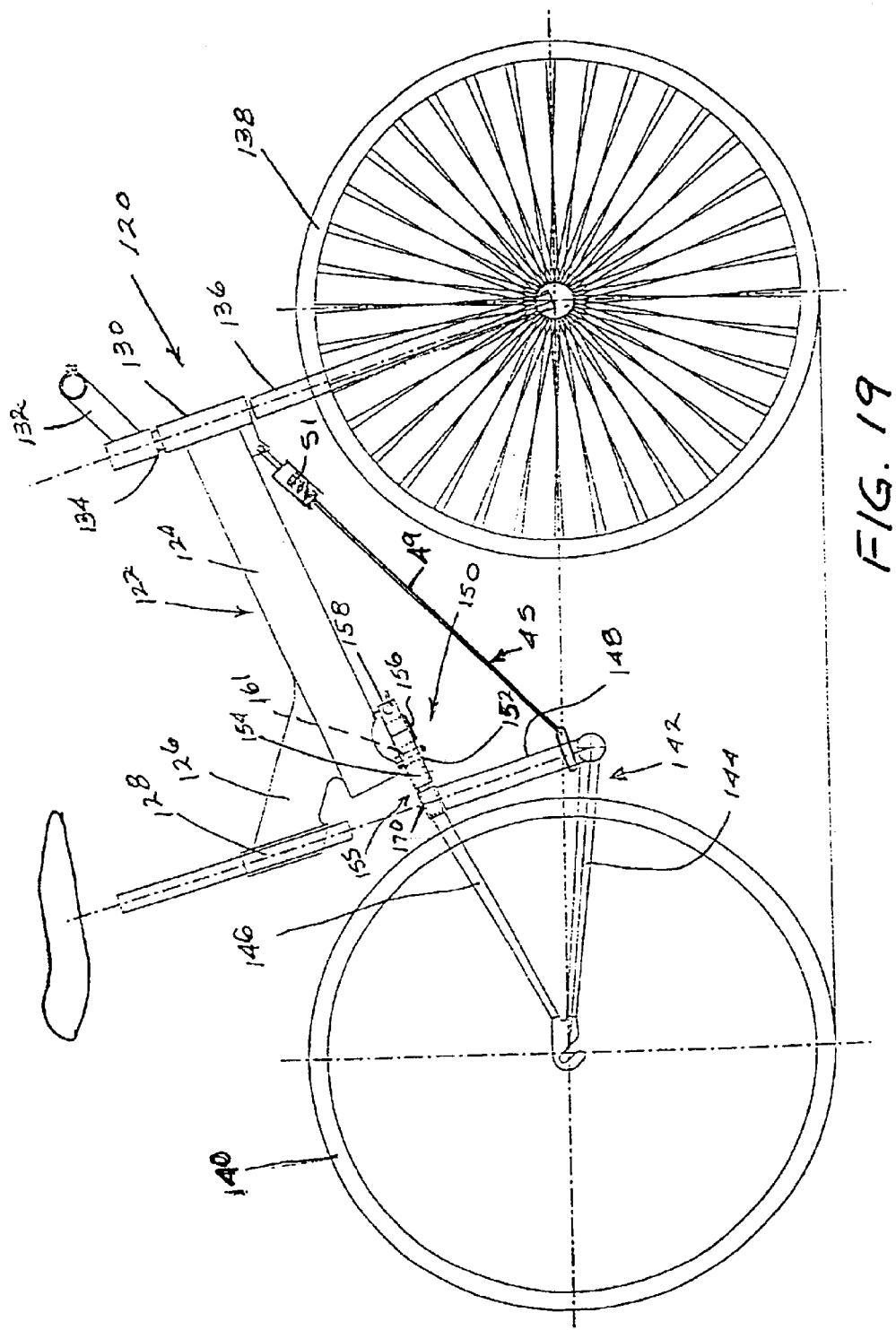
FIG. 19 is a side elevational view of a bicycle incorporating a folding bicycle frame of the present invention.
Figure 20:
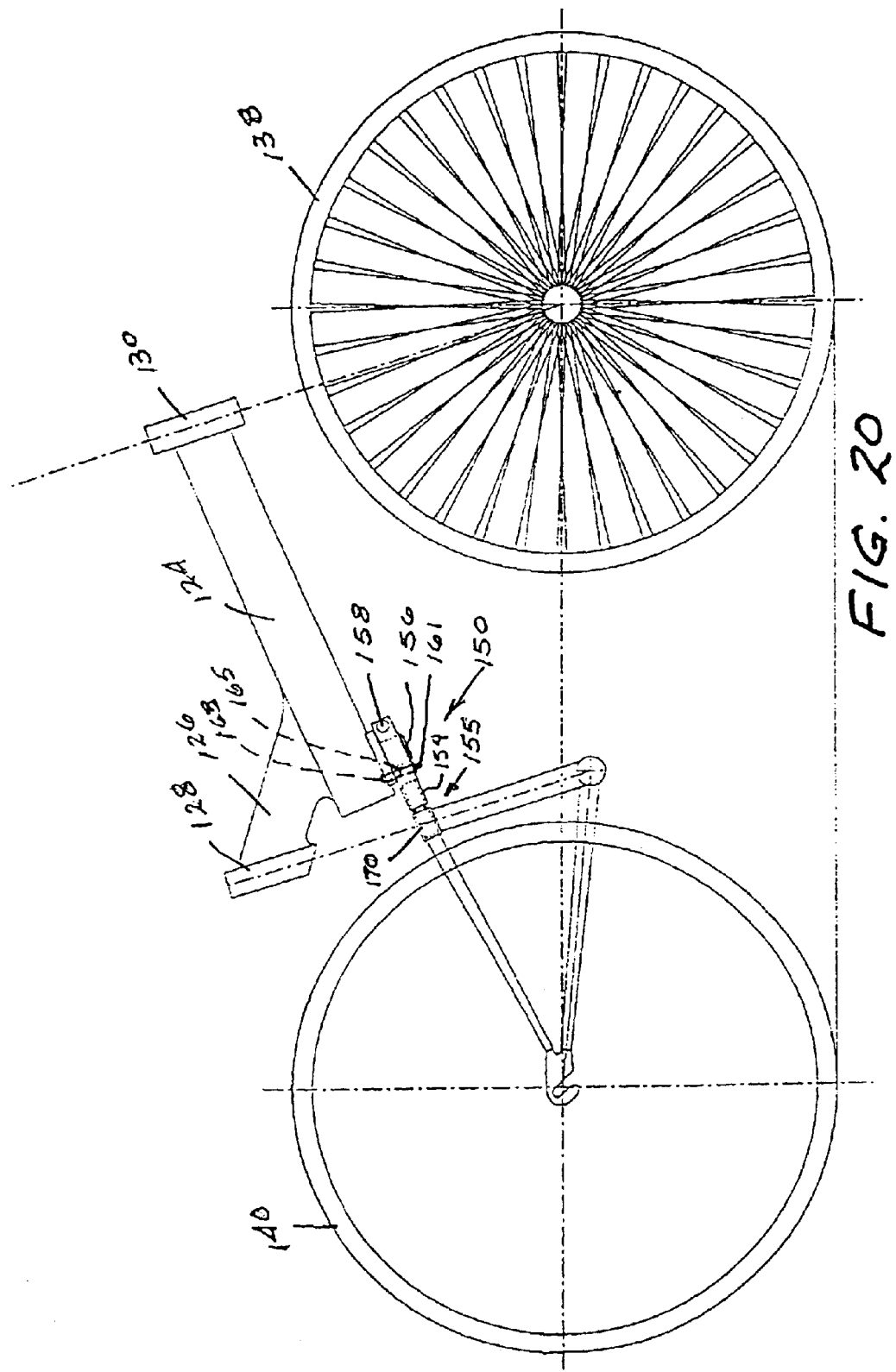
FIG. 20 is a side elevational view of the bicycle frame of FIG. 19, with the seat and handlebars removed.
Figure 21:
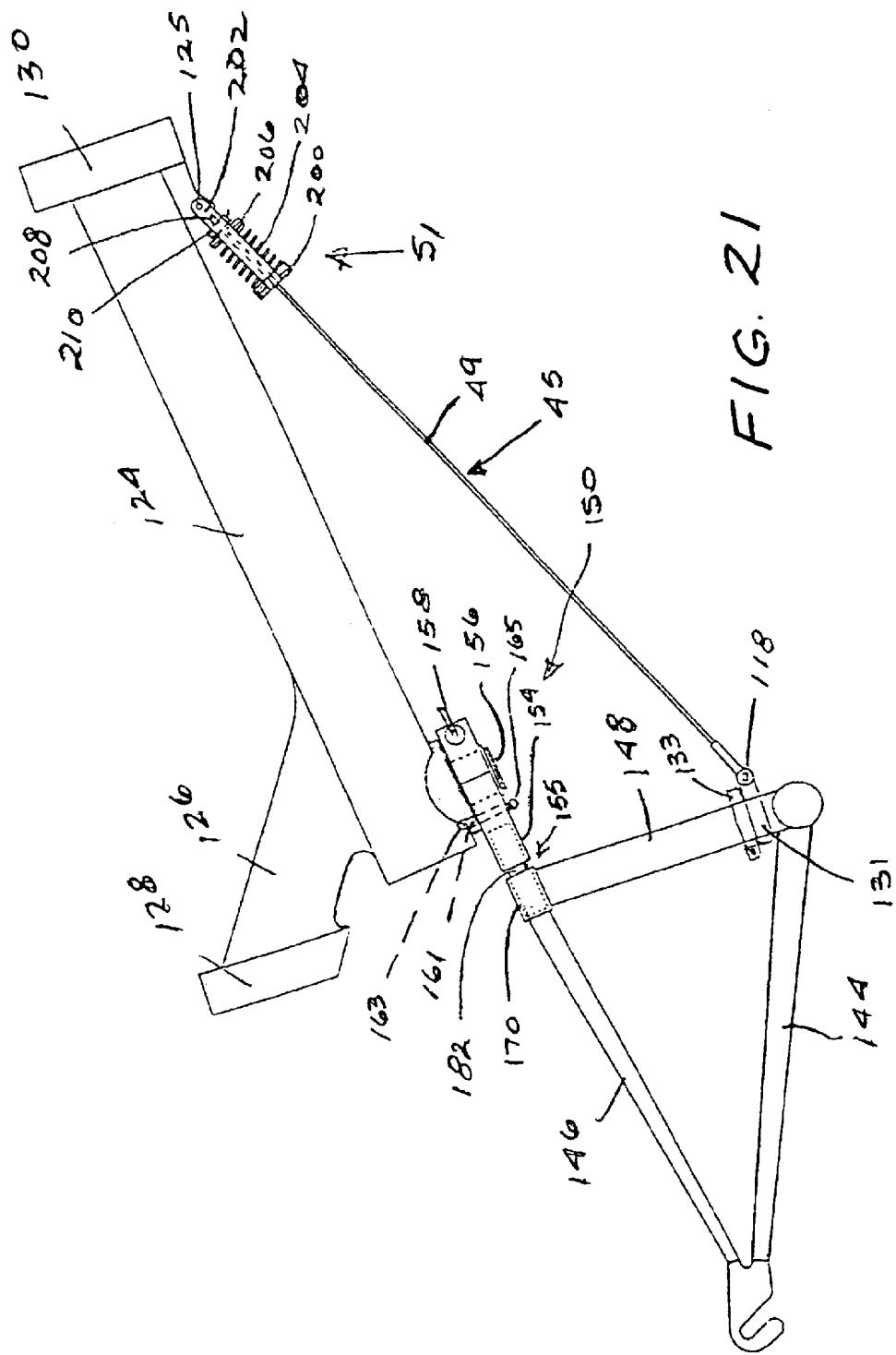
FIG. 21 is a side elevational view of the bicycle frame of FIG. 19.

Another embodiment of a bicycle 120 incorporating the features of the present invention is shown in FIGS. 19–22. Bicycle 120 is a folding bicycle and comprises a frame 122 that is similar to the frame 12 of the bicycle shown in FIG. 1. Frame 122 includes a crossbar 124, an upwardly and rearwardly extending mounting bracket 126 at the rear end thereof, and a seat tube 128 attached to bracket 126. A seat mounted on a seat stem fits on the seat tube. A head tube 130 is mounted on the front end of crossbar 124. Handlebars 132 are mounted in the head tube by means of a steerer stem 134 that fits inside of head tube 130. A fork 136 is mounted at the lower end of head tube 130, and wheel 138 is mounted in the fork. A rear wheel 140 is mounted on a back triangle 142, which comprises chainstays 144, seatstays 146, and a downtube 148. All of this is substantially the same as the first embodiment described above. The distinction in this embodiment of the invention is that the back triangle is connected to the front portion of the frame by means of a swivel mechanism 150. Swivel mechanism 150 comprises an elongated pivot arm 152 (FIGS. 29 and 30) that has a mounting block 154 for the rod spring mechanism 155 at a rear end. The pivot arm has a vertical opening 157 therethrough that is pivotally mounted on a pivot shaft 156 that extends downwardly from a rear portion of crossbar 124. A quick release locking mechanism 158 extending between spaced flanges 159 can be tightened and released in order to clamp arm 152 in a fixed operating position on pivot shaft 156, where the arm extends rearwardly in line with the crossbar, as shown in FIGS. 19 and 21. A spring mounted locking pin 161 can be used to securely lock the pivot arm in operation position. Pin 161 fits in crossbar opening 163 to releasingly lock the back triangle in its operating position. The pin can be released by pulling down on stem 165 in order to collapse the frame to the position shown in FIG. 22.

As shown in FIG. 22, when the locking mechanism is released, the back triangle of the frame can be pivoted forwardly so that it is positioned under the crossbar, for purposes of transportation or storage of the bike or bike frame.

The spring mechanism 155 of the folding bicycle can be the same as the spring mechanism for the non-folding bicycle described above. Alternatively, a modified spring mechanism, disclosed in detail in FIGS. 23–28, can be employed. In this embodiment, front and rear mounting blocks 154 and 170, shown in FIG. 23, can be constructed substantially similar to the mounting blocks described above (preferably similar to block 99), with the exception that, instead of a single vertical opening through each mounting block, there are two spaced openings 174 and 176, each of which can have a threaded portion 175 and 177 in the lower side of the mounting block in order to receive a locking bolt. Openings 174 and 176 are oriented so that they partially intersect openings 178 and 180 that extend through the mounting block for the fiberglass rod springs. Fiberglass rods 182 and 184 (which can be identical) are mounted in openings 178 and 180. Fiberglass rods 182 and 184 are the same as the fiberglass rods disclosed above for the other embodiments, with the exception that the rods have arcuate cutaway portions 188 and 190. These mate with openings 174 and 176. Thus, when locking bolts are fitted through openings 174 and 176 with the springs in place, the bolts fit through cutaway portions 188 and 190 and then are tightened in the mounting block. The arcuate openings 188 and 190 in the spring rod cause the spring rod to be locked in one particular axial position in the mounting block as long as the bolt is in place. Thus, the bolts in the mounting block serve both as a safety lock to prevent the bicycle frame from falling apart if a bolt is loose and they also serve as locators to properly locate the axial position of the fiberglass rod within the mounting block. By using the bolts as locators and a safety lock, a desired spacing between the two mounting blocks can be achieved for maximum spring effectiveness, and the bolts prevent the occurrence of an accident due to a rod spring being released from its mounting block.

The cable 49 interconnecting the back triangle and the head tube or front of the crossbar is the same as other embodiments. This cable can include releasable pins 118 and 125 at opposite ends that permit the cable to be released for removal or adjustment if desired. The cable is attached to a collar 131 mounted on the down tube 148 at the rear end. Collar 131 can rotate around down tube 148. A clamp 133 clamps on the down tube above collar 131 to prevent upward axial movement of collar 131. In the illustrated embodiment, it is not essential that collar 131 be rotatable around the down tube, so collar 131 and clamp 133 could be combined. The cable does not have to be released for folding, however. The front end of the cable is attached to the crossbar by means of a spring connector 51. The spring connector includes a pressure plate 200 attached by ears 202 to the crossbar by pin 125. A coil spring 204 is positioned between the ears. A rod on the end of the cable extends through the spring and through another pressure plate 206 to a threaded end 208. A locknut 210 fits on the threaded end and bears against the end of pressure plate 206 so that when tension is exerted on the cable, the spring is compressed. The cable provides a flexible tension connection that complements the action of the rod spring mechanism.

It should be understood that the foregoing is merely exemplary of the preferred practice of the present invention and that various changes and modifications may be made in the arrangements and details of construction without departing from the spirit and scope of the present invention.

We claim:

1. In a bicycle frame comprising a front portion, to which a front fork and front wheel are mounted, and a rear portion, to which a rear wheel is mounted, wherein the front and rear frame portions are interconnected by a flexible spring that extends between opposed spring mounting blocks on the front and rear portions, the mounting blocks having openings therein that receive and hold opposed ends of the spring, such that the spring flexes between the mounting block to provide flex for the frame, the improvement wherein:

the spring comprises at least two laterally spaced spring elements in the form of elongated rod springs, the mounting blocks having spaced openings therein to receive ends of the rod springs the openings in the mounting blocks being of adjustable size and the mounting blocks including clamping means for adjusting the size of the openings in the mounting blocks to cause the ends of the rod springs to become securely clamped in the mounting blocks, the clamping means being releasable to permit removal and replacement of the rod springs.

2. A bicycle frame according to claim 1 wherein the rod springs comprise elongated cylindrical rods comprising fiber reinforced plastic resin.

3. A bicycle frame according to claim 1 wherein the mounting blocks comprise spaced openings for ends of the respective rods, the openings being connected by a slot, the sides of the slot being clamped together by the clamping means to clamp the rods in the mounting block.

* * * * *